A. A. PAYSEN.
FISH HOOK.
APPLICATION FILED APR. 21, 1909.
984,963. Patented Feb. 21, 1911.
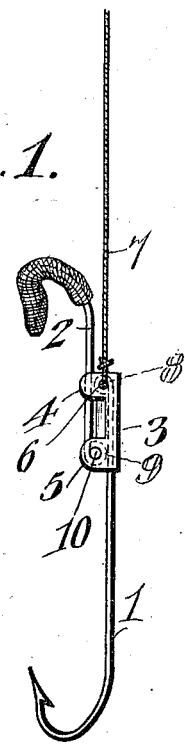
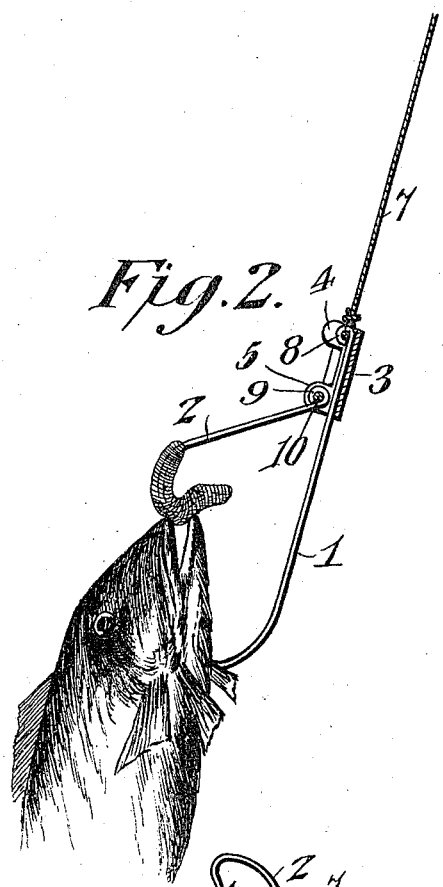
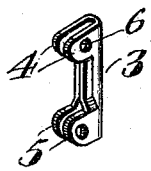
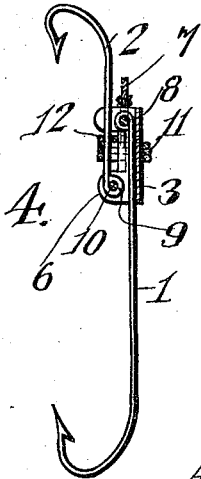
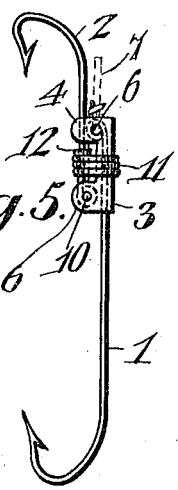
Witnesses
Jas. H. McCathran
H. F. Riley
Inventor
Andrew A. Paysen,
By C. G. Biggers
Attorney

UNITED STATES PATENT OFFICE.

ANDREW A. PAYSEN, OF ST. LOUIS, MISSOURI.

FISH-HOOK.

984,963.  Specification of Letters Patent.  Patented Feb. 21, 1911.

Application filed April 21, 1909. Serial No. 491,216.

*To all whom it may concern:*

Be it known that I, ANDREW A. PAYSEN, a citizen of the United States, residing at St. Louis, State of Missouri, have invented a new and useful Fish-Hook, of which the following is a specification.

The invention relates to improvements in fish hooks.

The object of the present invention is to improve the construction of fish hooks, and to provide a simple, inexpensive and efficient fish hook, equipped with a bait hook and a gaff hook and so arranged that, when a fish pulls upon the bait hook, the gaff hook will be thrown from beneath into the belly of the fish.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a fish hook, constructed in accordance with this invention, the bait hook being raised. Fig. 2 is a longitudinal sectional view of the same, illustrating the arrangement of the parts when a fish takes the bait. Fig. 3 is a detail perspective view of the clip. Fig. 4 is a longitudinal sectional view, illustrating a modification of the invention. Fig. 5 is a side elevation of the same.

Like numerals of reference designate corresponding parts in all the figures of the drawing.

The fish hook in its simplest form embodies a lower gaff hook 1, an upper pivoted bait hook 2 and a clip 3, constructed of thin sheet metal and doubled longitudinally to provide two sides between which is arranged an upper portion of the shank of the stem of the gaff hook 1. The clip 3 is provided with spaced upper and lower projecting portions 4 and 5, arranged in pairs, as clearly illustrated in Fig. 3 of the drawing. The upper projecting portions are provided with registering perforations forming an eye 6 for the attachment of a fishing line 7, and the gaff hook 1 is preferably provided at the upper end of the shank or stem with an eye 8, which registers with the perforations of the upper projecting portions of the clip. By this arrangement the fishing line is passed through the eye of the clip and the eye of the gaff hook. The gaff hook is secured between the sides of the hook by compressing the metal around the shank or stem, but it may be attached to the clip in any other desired manner, as will be readily understood.

The shank or stem of the bait hook 2 is provided with an eye 9, which is pivoted between the lower projecting portions or ears 5 by a rivet or pin 10. The upper pair of projections 4 form jaws and constitute clamping means for engaging the shank of the bait hook for holding the same in an elevated position, as illustrated in Fig. 1 of the drawing. When the bait hook is elevated the point extends downward and when a fish takes hold of the bait, the bait hook is pulled downward and the gaff hook 1 is caused to strike upward beneath the fish and embed itself in the belly of the same. By this arrangement an effective fish hook is provided, and it is almost impossible for the gaff hook to miss a fish pulling at the bait. In Figs. 4 and 5 of the drawing is illustrated a modification in which the fish hook is equipped with an elastic band 11, extending around the clip and arranged between the upper and lower spaced projections thereof and adapted to return the bait hook to its elevated position. The upper and lower projections form stops for preventing the displacement of the elastic band, when the hook is elevated, and the upper projections will prevent the elastic band from slipping outward along the clip. The band is provided with a loop or portion 12 encircling the shank or stem of the fish hook and adapted to assist in preventing movement of the band along the stem. The elastic band will prevent a slight movement of the bait hook produced by the nibbling of a fish, from disengaging the bait hook from the clip. Instead of arranging the elastic band, as illustrated in Figs. 4 and 5, it may be secured to the clip and connected with the bait hook in any other suitable manner.

Having thus fully described my invention, what I claim as new and desire to secure by Letters Patent, is:—

1. A device of the class described including a lower gaff hook, a clip secured to the upper end of the lower gaff hook and provided with upper engaging portions or jaws and having lower spaced ears, a bait hook pivoted between the ears and adapted to be supported in an elevated position by the jaws, and an elastic band encircling the clip between the ears and the jaws and connected with the bait hook to swing the latter upward automatically and to maintain the same in an elevated position.

2. A device of the class described including a lower gaff hook provided at the upper end with an eye, a metal clip composed of spaced sides embracing the gaff hook and having perforations registering with the said eye to receive a fishing line, said clip being provided with lower ears and having upper spaced jaws, and a bait hook pivoted between the ears and arranged to be supported in an elevated position by the jaws.

3. A device of the class described including a lower gaff hook, a metal clip composed of spaced sides and embracing the gaff hook at the upper end of the stem and provided with lower ears and having upper spaced jaws, said clip being provided at the jaws with opposite perforations, a bait hook pivoted between the ears and arranged to swing upwardly between and adapted to be supported in an elevated position by the jaws, and a fishing line passing through the perforations of the clip and secured to the latter beyond the bait hook, the latter having a swinging movement independent of the movement of the fishing line.

4. A device of the class described including a lower gaff hook, means at the upper end of the hook for the attachment of the outer terminal of a fishing line, a bait hook pivotally connected with the gaff hook at an intermediate point between the ends of the same and having a swinging movement independent of the fishing line, and an elastic band connected with the stems of the bait hook and the gaff hook to swing the bait hook upward automatically and to maintain the same in an elevated position.

In testimony, that I claim the foregoing as my own, I have hereto affixed my signature in the presence of two witnesses.

ANDREW A. PAYSEN.

Witnesses:
JOSEPH ROTTY,
KATHERINE ROTTY.